though the membrane is an electrical insulator, no current can flow into the specimen when the electrode is in use.

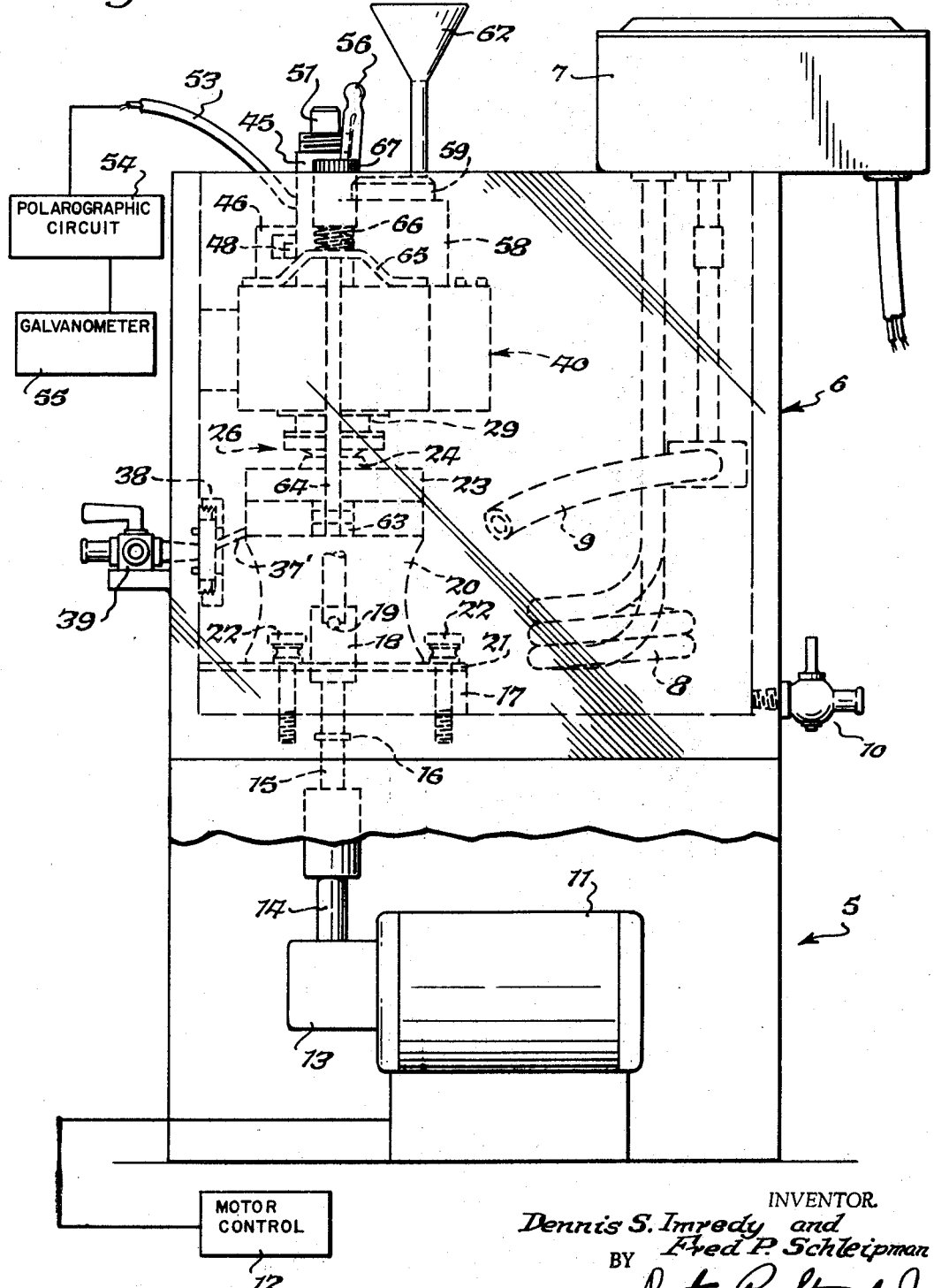

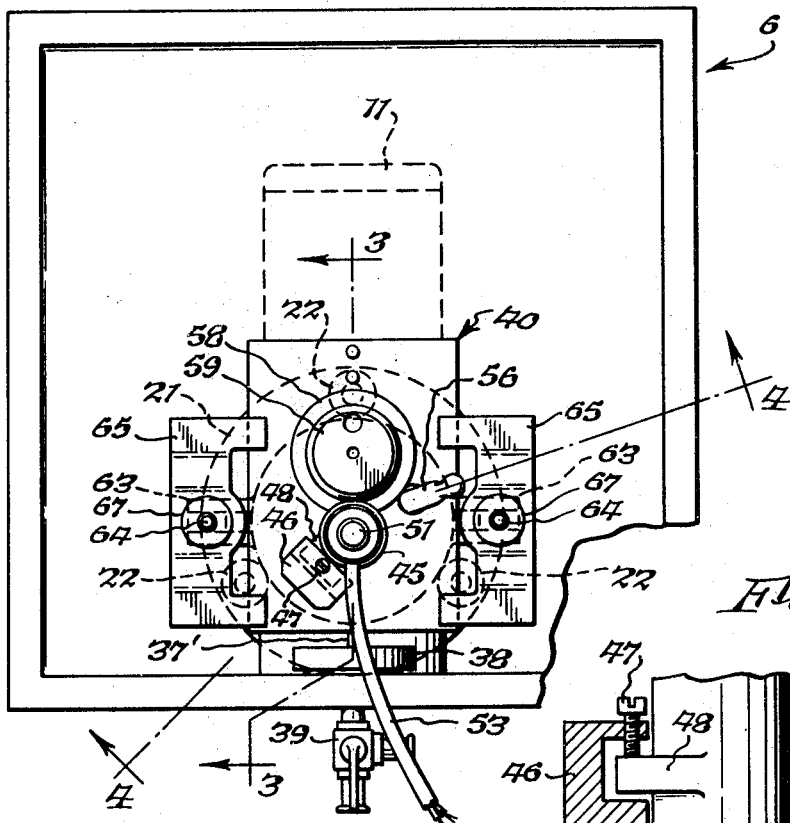

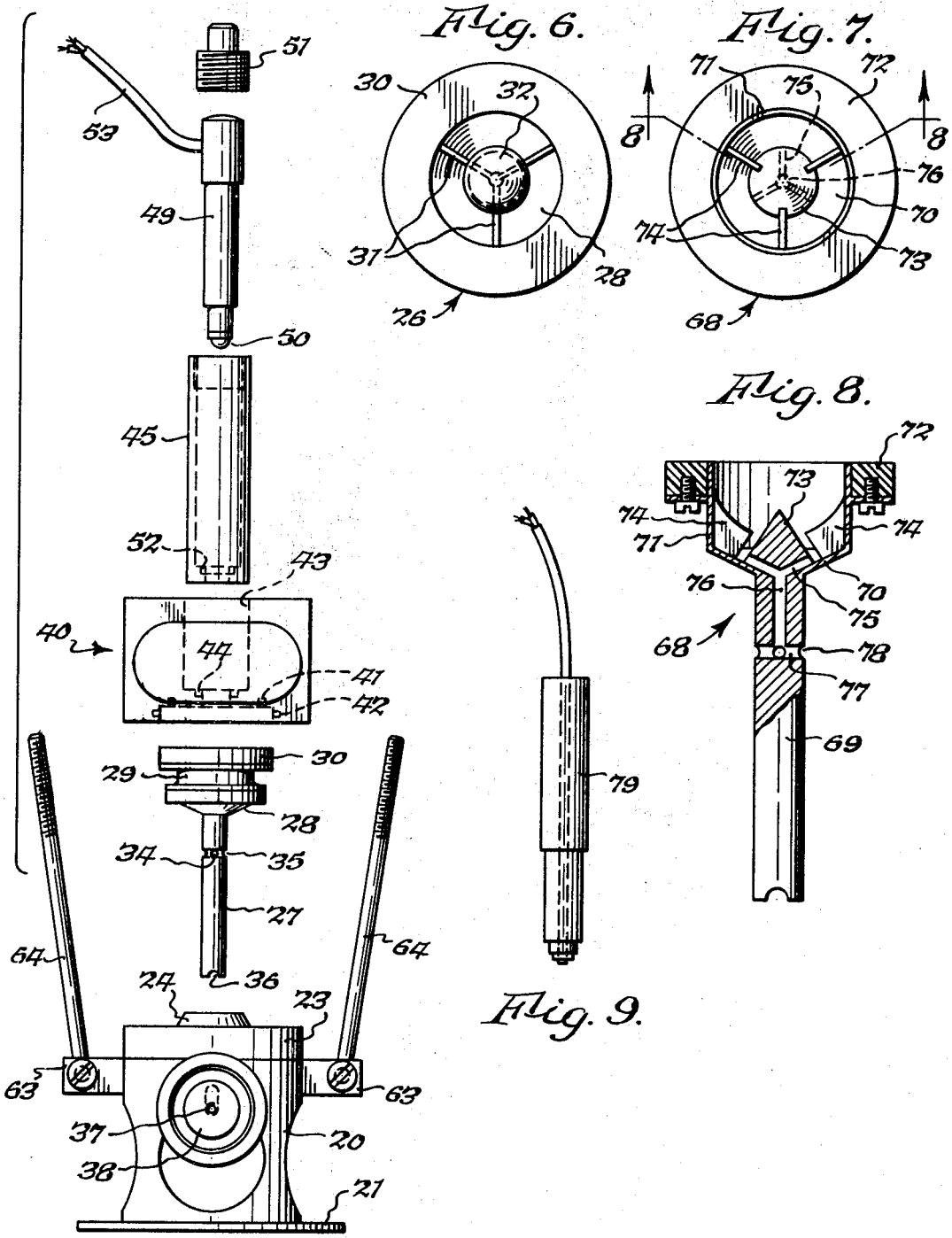

United States Patent Office 3,498,889
Patented Mar. 3, 1970

3,498,889
OXYGEN SENSING CELL AND METHOD OF USING SAME
Denis S. Imredy, Lyme, N.H., and Fred P. Schleipman, Norwich, Vt., assignors to United States Catheter & Instrument Corporation, Glens Falls, N.Y., a corporation of Delaware
Filed Apr. 19, 1966, Ser. No. 543,590
Int. Cl. B01k 3/00
U.S. Cl. 204—1
11 Claims

ABSTRACT OF THE DISCLOSURE

This invention concerns an oxygen polarograph designed to accurately measure the oxygen tension of biological fluids, e.g. blood under in vitro conditions by moving the fluid past an electrode-membrane unit so as to obtain results similar to in vivo results.

---

This invention relates to new and useful improvements in instruments for polarographic measurements of oxygen tension in blood and certain other biological fluids and particularly seeks to provide novel means for making such measurements under in vitro conditions in a manner to produce results close to those obtainable under true in vivo conditions.

It is known that a sensing cell of the type described in U.S. Letters Patent No. 2,913,386, issued to L. C. Clark, Jr. on Nov. 17, 1959, can be used for the in vitro measurement of oxygen tension in blood under certain conditions.

Such cell generally consists of a platinum cathode and an annular silver anode suported within a unit containing an electrolyte and covered by a gas-permeable membrane. The unit is maintained at 0.6 volt, but since the membrane is an electrical insulator, no current can flow into the specimen when the electrode is in use.

When oxygen molecules from the specimen (blood) diffuse through the membrane to the polarized cathode's surface the cathode becomes depolarized, allowing a measurable current to flow which initially is directly proportional to both the amount of oxygen contacting the cathode and to the oxygen content of the specimen. However, due to the relatively slow diffusion of oxygen in quiescent fluids, especially blood, the consumption of oxygen molecules through depolarization at the cathode is faster than the rate of diffusion through the membrane and the oxygen concentration of the quiescent or stagnant specimen adjacent the cathode's tip will rapidly and continuously decrease as will the electric current created by depolarization. When this condition is reached the electric current is no longer directly proportional to the oxygen content of the specimen and measurements thereof for the purpose of determining the oxygen content of the specimen are worthless.

It has also been observed that plastic membranes, when immersed in quiescent or stagnant blood, exhibit a certain staining which reduces the permeability of the membrane and make accurate determination of the oxygen concentration of the specimen even more difficult.

These undesirable conditions or phenomena can be overcome through the use of this invention in which the blood specimen flows continuously past the electrode's tip as it would if in vivo measurements were made where the oxygen-containing blood is continuously replaced adjacent the electrode's tip.

Therefore, an object of this invention is to provide an instrument for measuring the oxygen content of blood which includes an electrochemical sensing device and means for causing a blood specimen to flow continuously past the sensing device whereby to permit the taking of measurements under uniform conditions.

Another object of this invention is to provide an instrument of the character stated in which the sensing device includes a cell consisting of a metallic cathode and an annular metallic anode supported within a unit containing an electrolyte and covered by a gas-permeable membrane.

Another object of this invention is to provide an instrument of the character stated which includes a rotary cuvette positioned in proximity to the membrane-covered end of the sensing electrode, means for introducing a quantity of specimen into the cuvette and means for rotating the cuvette at a controlled speed whereby to continuously and uniformly move the specimen past the tip of the electrode.

Another object of this invention is to provide an instrument of the character stated which includes means for maintaining the sensing electrode and the cuvette and its contained specimen at a predetermined uniform temperature.

Another object of this invention is to provide an instrument of the character stated which includes a temperature indicating device operatively associated with the specimen contained within the cuvette for accurately determining the temperature of the specimen at any desired time.

Another object of this invention is to provide an instrument of the character stated in which calibration thereof can be effected without the use of a separate instrument such as a tonometer.

A further object of this invention is to provide an instrument of the character stated that is so constructed that removal or replacement of the sensing electrode may be readily effected.

A further object of this invention is to provide an instrument of the character stated that can be easily disassembled for cleaning.

With these and other objects in view, the invention will be more fully understood by reference to the drawings, the accompanying detailed description and the appended claims.

In the drawings:
FIG. 1 is a side elevation of a polarographic instrument constructed in accordance with this invention with parts located within the water bath shown in dotted lines and the lower portion of the base broken away to show the motor and drive;
FIG. 2 is a top plan view thereof;
FIG. 3 is a vertical section taken along line 3—3 of FIG. 2;
FIG. 4 is an enlarged vertical section taken along line 4—4 of FIG. 2;
FIG. 5 is an exploded view of most of the main parts of the invention;
FIG. 6 is an enlarged top plan view of the cuvette;
FIG. 7 is an enlarged top plan view of an alternate cuvette used when only very small specimen samples are available;
FIG. 8 is a vertical section taken along line 8—8 of FIG. 7; and
FIG. 9 is an elevation of an adapter fitting for use with catheter electrodes.

Referring to the drawings in detail, the invention as illustrated is embodied in a water bath unit mounted on a base 5 and includes a rectangular tank 6 formed from a clear plastic such as Plexiglas, a thermostatically controlled water heater 7, internal bath heating coils 8 depending from the heater 7, a water circulating pump 9 depending from the heater 7 and a drain cock 10.

A variable speed reduction geared motor generally indicated 11 is mounted within the base 5 and is connected to a power supply through any suitable variable speed motor control 12. The motor 11 is provided with a right angle drive 13 terminating in a vertical shaft 14 which is coupled to a shaft 15 extending upwardly through the bottom of the tank 6. Water leakage around the shaft 15 is prevented by a rubber O-ring gasket 16. The upper end of the shaft 15 projects above the top of a spacer ring 17 fastened to the bottom of the tank 6 and is provided with a socket-type coupling 18 having a transverse drive pin 19 in its upper socket portion.

A tubular mount 20 is provided with a base flange 21 and is removably affixed to the spacer ring 17 by a plurality of knurled-head screws 22. The upper end of the mount 20 is closed by a Plexiglas plug 23 provided on its upper face with a "Teflon" (Du Pont's polytetrafluoroethylene) thrust washer 24. The plug 23 is axially bored to rotatably receive the stem of a cuvette and is provided with a pair of vertically spaced annular grooves which retain a pair of rubber O-ring gaskets 25, 25.

The essence of this invention involves the use of a cuvette generally indicated 26 and includes a stem or shaft 27 and a generally cylindrical body having an inverted cone-shaped metallic base 28 and a thin walled metal shell 29 terminating at its upper end in a Plexiglas annulus 30. The inside of the base 28 is provided with three radial fins or ribs 31 which support a hemispherical dome 32 having a diameter substantially less than the inside diameter of the shell 29.

The base 28 and the upper end of the stem 27 are provided with an axial bore 33 terminating at its lower end at a radial bore 34 which extends into communication with an annular groove 35 formed in the stem.

The lower end of the stem 27 is provided with a transverse groove 36 having a diameter substantially equal to that of the drive pin 19 so that when the cuvette is installed in the mount 20 its lower end becomes positioned intermediate the O-ring gaskets 25.

A downwardly extending radial duct 37 formed in the plug 23 has its upper end horizontally aligned with the annular groove 35 of the stem 27 and its lower end connected to one end of a tube 37', the other end of which passes through a gland 38 and the associated end wall of the tank 6 and is connected to a three-way Luer lock stopcock 39. Thus blood or other liquid specimens, calibrating gases or flushing liquids may be readily supplied to the interior of the cuvette.

A generally rectangular mounting block indicated at 40 is preferably formed from Plexiglas, and is provided on its lower face with an annular recess corresponding in diameter and depth to the diameter and depth of the cuvette annulus 30. The base of the annular recess is fitted with an O-ring gasket 41 and its wall is fitted with an O-ring gasket 42 so that when the block 40 is mounted on top of the cuvette, an air and liquid tight seal will be effected therebetween while still permitting the cuvette to be rotated with respect thereto.

A vertical receiving bore 43, having its axis somewhat offset from the axis of the cuvette, extends downwardly from the top of the block 40 into proximity with the annular recess in the bottom thereof, and is provided at its bottom with a lesser-diametered circular aperture extending into open communication with that annular recess. An O-ring gasket 44 is fitted in the bottom of the bore 43.

A mounting sleeve 45 is inserted in the bore 43 with its lower end engaged against the O-ring gasket 44 and is removably retained therein by a clamp 46, on the block 40, which is provided with a clamp screw 47 engageable with a radially projecting lug 48 formed integral with the sleeve 45.

A suitable polarographic cell 49, preferably of the general type disclosed in the above mentioned U.S. Letters Patent No. 2,913,386, is fitted within the sleeve 45 so that its lower permeable membrane-containing end 50 extends through the bottom annular recess in the block 40 into the interior of the cuvette 26. A plug 51, threadably engaged in the upper end of the sleeve 45, firmly holds the cell 49 in position against an O-ring gasket 52 fitted adjacent the bottom of the sleeve. The cell 49 is provided with a two-wire lead 53 which, as indicated in FIG. 1 of the drawings, is connected to a polarographic circuit 54 and then to a recording galvanometer 55.

The block 40 is also bored to receive a laboratory thermometer 56 so positioned that its bulb end projects through the bottom annular recess of the block and a sufficient distance into the interior of the cuvette 26 so as to be immersed in a specimen carried therein. The lower end of the thermometer bore is preferably fitted with an O-ring gasket 57 to provide an air- and liquid-tight seal around the thermometer.

An annulus 58 extends upwardly from the top of the block 40 and has its top closed by a plug 59 and its bottom extending into open communication with a generally funnel-shaped chamber 60 formed in the block in such a manner that the throat or bottom of the funnel communicates with the interior of the cuvette 26 through the bottom annular recess of the block. Thus the interior of the cuvette, the chamber 60 and the interior of the annulus 58 together define a compound chamber of substantial volume, although the net volume of the cuvette in its "in use" position is quite small (i.e. about 4.0 ml.).

A solenoid operated gate valve 61, carried within the block 40, may be used to open and close communcation between the interior of the cuvette and the chamber 60. The annulus plug 59 is provided with an air-intake hole fitted with a small funnel 62 which permits outward passage of calibration gases from the chamber 60 and which is also used for the introduction of saline solutions to flush the system after polarographic meaurements of a specimen have been completed.

Besides serving as part of a gas collecting tube for calibrating purposes, the chamber 60 receives and retains the initial volumetric portion of the injected specimen that might be considered as contaminated by the air of the empty cuvette, while the remainder of the specimen is retained within the cuvette and builds up a sealing column around and above the tip 50 of the electrode 49. Then when the gate valve 61 is closed the "contaminated" initial portion of the specimen is isolated from the remainder and in effect creates a double seal for further assurance of the accuracy of determinations.

The block 40 and its associated elements are removably retained in operative position over the cuvette 26 by a pair of spring loaded clamps extending from the block to the tubular mount 20.

The mount 20 is provided with a pair of oppositely extending bifurcated lugs 63, 63 to which are pivotally attached the lower ends of a pair of eye bolts 64, 64. The eye bolts 64 extend through slots formed in the associated ends of the block 40 and project a substantial distance thereabove. A clamp plate 65, compression spring 66 and knurled loading nut 67 are then successively engaged over the upper projecting end of each eye bolt 64 to apply clamping pressure to the block 40 against the resistance of the eye bolts.

FIGS. 7 and 8 of the drawings show an alternate type of cuvette generally indicated 68 and especially useful in connection with small quantity specimens. This cuvette includes a stem or shaft 69, a thin wall inverted conical bottom 70, a thin wall cylindrical shell 71, all formed of metal, and a Plexiglas annulus 72 at the top.

The interior of the cuvette 68 is partly filled by a conical element 73 and three inwardly directed, generally triangular, radial fins 74. The element 73 is provided at its bottom with three radial ducts 75 which bisect the angles between the fins 74 and have their axes parallel to the surface of the conical bottom 70.

The upper end of the stem 69 is provided with an axial bore 76 extending from the convergence of the ducts 75 to a radial bore 77 which opens into communication with an annular groove 78 formed in the stem.

It will be appreciated that the proportions and dimensions of the cuvette 68 are such that it is fully interchangeable with the cuvette 26.

FIG. 9 of the drawings is illustrative of a typical silicone rubber adapter 79 that can be used when electrodes of different configurations are to be either calibrated or used directly for polarographic measurements with this instrument. Its outer dimensions conform the inner dimensions of the sleeve 45 in order to fit properly and its axial bore will, of course, conform to the outside diameter of a catheter or other type of electrode to be carried thereby.

Disassembly for cleaning may be easily effected as follows: First drain the water bath by opening the cock 10; then remove the clamps 65 which permits the block 40 and its associated elements to be lifted out; then release the clamp screw 47 to permit removal of the sleeve 45 and the cell 49; then withdraw the thermometer 56 from the block 40; then remove the plug 59 and funnel 62 from the annulus 58; then lift out the cuvette 26 from the mount 20; and finally remove the base screws 22 and disconnect the gland 38 to permit removal of the mount 20 and its associated elements. The three-way Luer lock stopcock 39 is independently removable.

In use, assuming that the water bath has been stabilized at the desired temperature (37° C.) along with the cuvette 26, the blood specimen withdrawn from the patient is pumped or otherwise introduced to the interior of the cuvette through the stopcock 39 and its associated tubes and ducts, including the axial bore 33 of the cuvette stem 27. The hemispherical dome 32 within the cuvette both prevents the specimen from directly impinging on the membrane end 50 of the cell 49 and enhances uniform distribution of the specimen around and over the radial fins 31. At this time the solenoid-actuated gate valve 61 is closed and the motor 11 is started to rotate the cuvette at a predetermined speed. The temperature of the specimen is constantly observed through the thermometer 56 and when it reaches exactly 37° C., the preset desired temperature according to this example, a reading of the galvanometer 55 is taken to provide an uncalibrated index of the oxygen content of the specimen.

Following this step the instrument itself is used for calibration purposes to establish a galvanometer reading under conditions of equilibrium when the specimen has become saturated with oxygen at the stated temperature, thus eliminating the need for a separate tonometer for this purpose.

To effect this calibration the gate valve 61 is again opened and various gas mixtures of known oxygen concentrations are introduced through the stopcock 39 and bubbled through the specimen until equilibrium is reached. To insure equal distribution of the gases and thereby accelerate saturation, the cuvette 26 may be rotated intermittently while gases pass through the system. When equilibrium is reached, as indicated by a steady galvanometer reading, the calibration value will be read off in exactly the same manner as it was for the specimen.

In this way the initial galvanometer reading of the unsaturated specimen at the desired temperature may be compared with the final galvanometer reading of the oxygen-saturated specimen to quantitatively indicate the oxygen content of the unsaturated specimen.

It will be appreciated from the foregoing description that this invention provides an extremely accurate instrument and method for oxygen tension determinations. Errors in such determinations are virtually eliminated due to the physical tightness of the system, the rapidly reached thermal equilibrium of specimens in the cuvette, accurate temperature control of the specimens in the cuvette, and the ability of the instrument to serve as its own tonometer for calibration purposes.

This high degree of accurate and reproducible result can only be achieved through the use of rotary cuvettes as described. The fins 31 of the cuvette 26 or the fins 74 of the cuvette 68 cause the contained specimens to bodily rotate at the same speed as the cuvettes, thus assuring a continuous uniform flow of specimen past the membrane end of the cell 49 and the bulb of the thermometer 56. Furthermore, when oxygen-containing gaseous mixtures are bubbled through the contained specimens rotation thereof under the influence of the cuvette will enhance distribution of the gaseous mixture therethrough and thus more rapidly effect saturation equilibrium.

It is, of course, to be understood that variations in arrangements and proportions of parts may be resorted to within the scope of the appended claims.

We claim:

1. An instrument for measuring in vitro the dissolved oxygen in a body liquid comprising an electro-chemical polarographic oxygen sensing cell having a barrier permeable to oxygen, means for continuously rotating an isolated small quantity of said body liquid in operative relationship, but off center of, said barrier, and means to determine the reaction of said polarographic cell.

2. The instrument of claim 1 wherein said liquid is blood (and said substance is oxygen).

3. The instrument of claim 2 additionally comprising means for maintaining said blood at a predetermined temperature.

4. The instrument of claim 3 wherein said barrier is at one end of said cell and additionally comprising means for mounting said cell in a fixed vertical position with its barrier end down, a cuvette surrounding the barrier end of said cell and mounted therebeneath for rotation about a vertical axis, means for introducing a sufficient quantity of specimen blood into said cuvette to at least contact the barrier end of said cell, and means to rotate said cuvette whereby to effect said blood rotation.

5. The instrument of claim 4 additionally comprising means for maintaining said cuvette and its contained blood at a predetermined temperature.

6. The instrument of claim 5 in which the inner surface of the cuvette is provided with at least one impeller rib to assist in causing the continuous movement of the contained blood.

7. The instrument of claim 5 that additionally includes means for determining the saturation equilibrium condition of oxygen in a specimen of blood.

8. The instrument of claim 5 that additionally includes means for determining the temperature of the specimen contained within the cuvette and means for determining the saturation equilibrium condition of oxygen in the specimen.

9. The instrument of claim 5 additionally comprising a conical chamber with its small end down and communicating with said cuvette at the level of said barrier, and closing means between said chamber and said cuvette whereby the top portion of said blood may be isolated from the portion to be tested by introducing a larger quantity and effecting said closing means.

10. In a method for quantitatively determining in vitro the amount of oxygen in a small isolated amount of body liquid by polarography the steps of, bringing a specimen of said body liquid and a polarographic sensing device to a condition of thermal equilibrium, using said sensing device to indicate an uncalibrated amount of oxygen in said specimen, then dispersing additional amounts of oxygen throughout said specimen until a condition of saturation equilibrium has been reached as indicated by said sensing device, and then comparing the first and second mentioned indications of said sensing device to provide a calibrated indication of the original amount of oxygen in said specimen, said specimen being kept in constant rotation relative to, but off center of, said sensing device at least during the times that quantitative indications are being taken.

11. The method of claim 10 in which any air-contaminated portion of the specimen is isolated from the remained thereof prior to the taking of any quantitative indications.

References Cited

UNITED STATES PATENTS 3,043,764   7/1962   Harvey _____ 204—195

T. TUNG, Primary Examiner

U.S. Cl. X.R.

204—195